United States Patent
Lai et al.

[11] Patent Number: 6,057,669
[45] Date of Patent: May 2, 2000

[54] AUTOMATIC CYCLICAL CHARGING SYSTEM FOR ELECTRIC VEHICLES

[76] Inventors: Kim-Shiang Lai; Show-Form Shih, both of No. 33, Hwa 4th St., Keelong, Taiwan

[21] Appl. No.: 09/111,756

[22] Filed: Jul. 8, 1998

[51] Int. Cl.[7] .......................................................... H02J 7/00
[52] U.S. Cl. ............................................ 320/116; 320/104
[58] Field of Search ...................................... 320/116, 104, 320/137; 180/65.1–65.8

[56] References Cited

U.S. PATENT DOCUMENTS 4,597,463  7/1986  Barnard .................................. 180/65.4

Primary Examiner—Peter S. Wong
Assistant Examiner—Lawrence Luk
Attorney, Agent, or Firm—Dougherty & Troxell

[57] ABSTRACT

An automatic cyclical charging system for electric vehicles including a plurality of battery jars connected in series, a direct current conversion alternator (UPS), a transformer stabilizer, and a charger. The battery jars output electric currents, which are converted to alternating currents. The alternating currents are transformed and stabilized before supplying to the charger for charging another battery jar unit that is in use, without using the power supplied by the vehicle's alternator. Therefore, the electric vehicle may have a continuous supply of electricity.

5 Claims, 3 Drawing Sheets

AUTOMATIC CYCLICAL CHARGING SYSTEM FOR ELECTRIC VEHICLES

BACKGROUND OF THE INVENTION (a) Field of the Invention

The present invention relates generally to an automatic cyclical charging system for electric vehicles, and more particularly to a charging system that utilizes voltage conversion to supply sufficient electric currents to an electric vehicle's battery jars so that the electric vehicle may have a continuous supply of electric currents.

(b) Description of the Prior Art

In view of environmental protection and resources conservation, the trend in the car manufacturing industry is to develop vehicles powered by electricity in place of existing vehicles that use gasoline, diesel oil and batteries. There has been limited production of electric cars available on the market, and they are not very popular with general consumers. The problem is not that their engines are not as powerful as gasoline engines but their incapability to travel long distances. This can be seen from the fact that the best-designed electric cars to date can only travel 100 kilometers. Besides, it takes a very long time to charge the car, about several hours in general. They are hardly comparable with existing cars, which only take several minutes to refill gasoline. Therefore, unless the above-mentioned problems are solved, even if governments wish to promote use of electric vehicles by setting relevant laws will be very difficult. It is also impossible to popularize electric vehicles.

The bottleneck encountered in the development of electric vehicles is that when direct currents are converted to alternate currents (AC 110V) to supply to an AC 110V silicon rectifier (charging device), since AC 110V is power-consuming yet outputting relatively small electric currents, the sudden drastic consumption of electricity at the instant of start of motor of the electric vehicle will cause electricity failure and cannot operate.

For electric vehicles powered only by using battery jars, the problems that remain unsolved to date include automatic recharging, large consumption of electricity at start, inability to idle-speed recharge (no charger) when vehicles stop or during traffic jams, electricity consumption of air-conditioners, etc. It is therefore desirable to find a way to enable the electric power of the battery jars to last for a longer time.

The standard voltage of electric vehicles is 24 volts, and they are generally equipped with 72-volt voltage. By utilizing a battery jar unit to supply electric power to a direct current conversion alternator (UPS) to convert direct currents (24V–72V) to alternating currents (AC 110v), which are then transformed and stabilized to become AC220V to supply electric power to a charger of a silicon rectifier to convert to direct currents DC 12V–72V for recharging all the battery jars, less the power consumed by the UPS, the power consumption will be reduced by one-fold while the output will increase by two-folds. Such a power supply system will satisfy the needs of the whole vehicle.

SUMMARY OF THE INVENTION

A primary object of the present invention is to provide an automatic cyclical charging system for electric vehicles so as to ensure a continuous supply of electric currents to an electric vehicle and thus enable electric vehicles to travel for a much longer time and to be commercialized.

Another object of the present invention is to provide an automatic cyclical charging system for electric vehicles, in which an independent battery jar unit is utilized to supply an air conditioning system of the electric vehicle so that the electric vehicle's air conditioning system may still normally function even when the electric vehicle is not moving.

A further object of the present invention is to provide an automatic cyclical charging system for electric vehicles, which prolongs the service life of battery jars to a considerable extent to help alleviate the problem of battery disposal.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
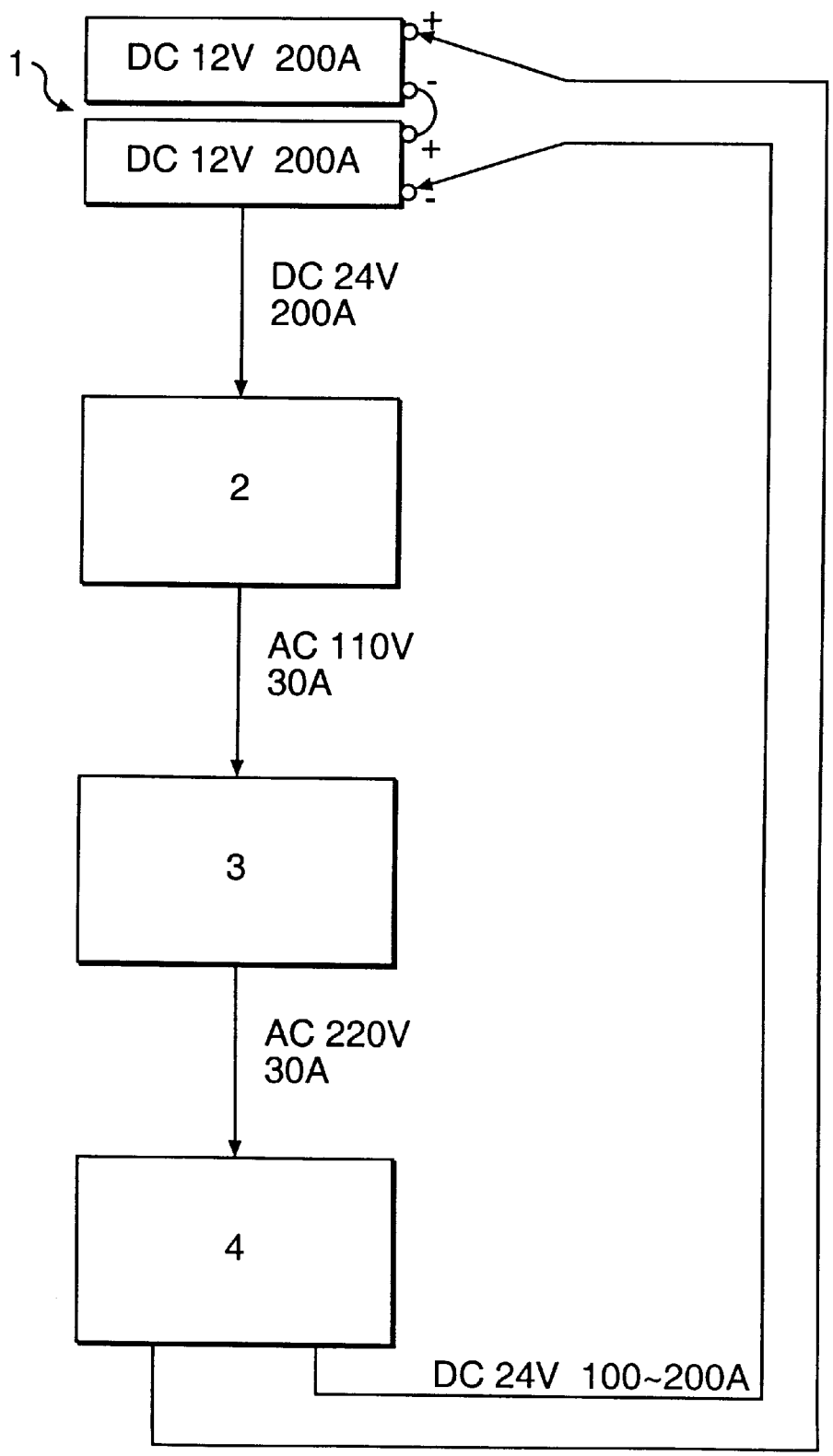
FIG. 1 is a system diagram of the first embodiment of the present invention.

With reference to FIG. 1, the automatic cyclical charging system for electric vehicles basically comprises a battery jar unit 1 to supply direct currents to a direct current conversion alternator 2 to convert to alternating currents, which are modified via a transformer stabilizer 3 and then supplied to a charger 4. The charger 4 outputs direct currents to the battery jar unit 1 for cyclical charging.

For example, the battery jar unit 1 includes two DC 12V 200 A battery jars connected in series to output DC 24V 200 A direct currents to the direct currents conversion alternator (UPS) 2 to be converted into AC 110V 30A. The alternate currents are then transformed and stabilized using the transformer stabilizer 3 to be output as AC 220V 30 A passing further into the charger 4 to be converted to DC 24V 100 A for charging the battery jar unit 1. The amount of electric currents of the charger 4 is adjustable and can reach 200 A at the maximum.

As this system does not use a power-consuming mechanical power generating system, the conversion process uses only 10 amperes of electric energy, while a charging capacity of DC 12V–24V to 100–200 A at the maximum may be achieved through DC/AC conversion and switching of the rise and fall of voltages. And power may be continuously supplied to the electric vehicle to charge the battery jars when the vehicle is moving.

Figure 2:
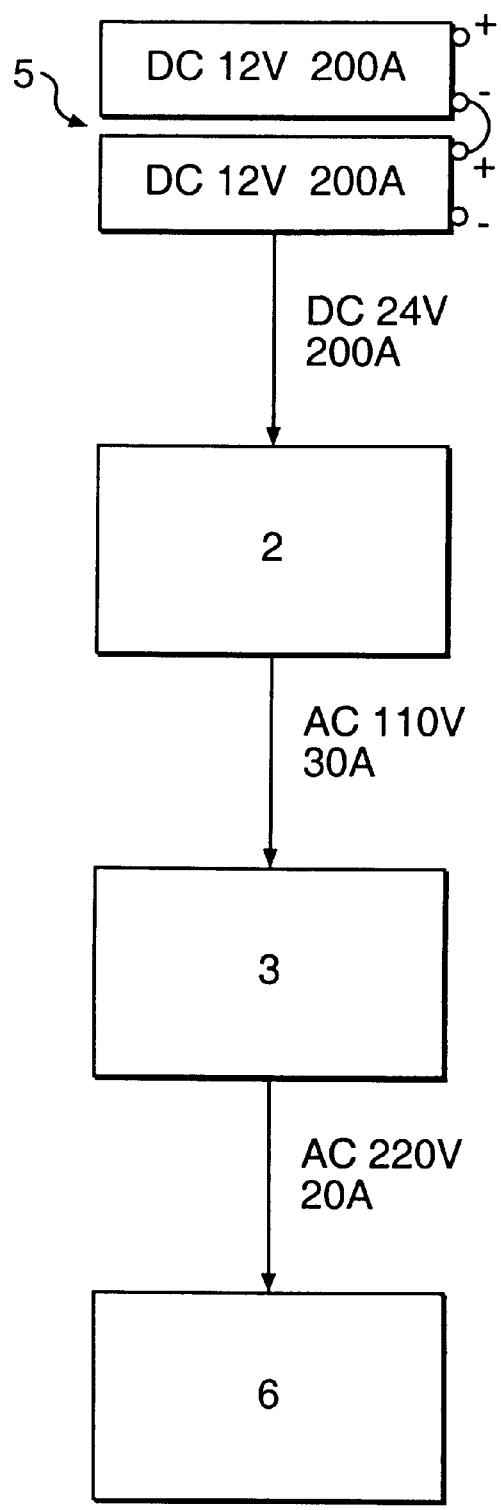
FIG. 2 is a system diagram of the second embodiment of the present invention.

FIG. 2 illustrates a second embodiment of the present invention taking an air conditioning system using AC 220V as an example. In general, operation requires 4 amperes, and instant start requires 8 amperes. In this system, a battery jar unit 5 includes two battery jars of 12V connected in series which output DC 24V 200 A to the UPS 2. The UPS 2 converts the direct currents to AC 110V 30 A which enter the transformer stabilizer 3 to be converted to AC 220 V 20 A for output to an air conditioning compressor 6 of AC 220V. The UPS 2 consumes only 10 amperes whereas the transformer stabilizer 3 uses up only 5 amperes. Hence, through the conversion of DC/AC and the switching of voltage rise and switching of the rise and fall of voltages, a battery jar unit of 24V 200 A may achieve alternating currents of 220V 20 A at the maximum to provide the compressor 6 with the necessary AC 200V for operation purposes.

Figure 3:
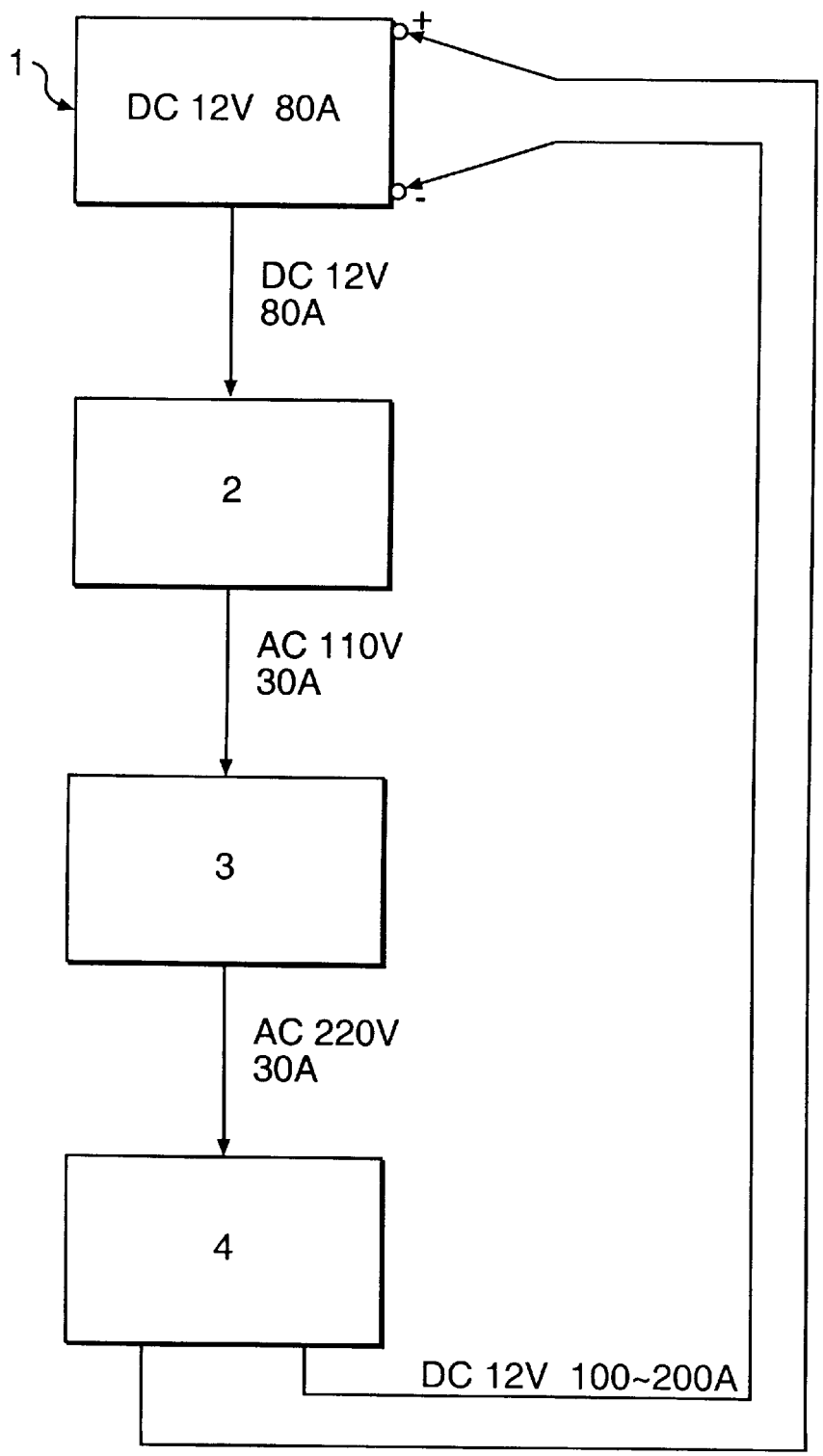
FIG. 3 is a system diagram of the third embodiment of the present invention.

FIG. 3 illustrates the third embodiment of the present invention. An electric motorcycle utilizes a single battery jar 1 to output DC 12V 80 A to the UPS 2 to be converted to AC 110V 30 A for output. The alternate currents are then transformed and stabilized by the transformer stabilizer 3 to become AC 220V 30 A and are further converted to DC 12V 100 A–200 A via the charger 4 of the silicon rectifier to supply electric power to the battery jar 1 so that the electric motorcycle has sufficient supply of electric power. The electricity flow of the charger 4 is adjustable and may reach 200 A at the maximum.

The key of the present invention is how to convert direct currents to alternating currents and use relatively large voltages to reduce electric power consumption and how to enable the electric vehicle to travel continuously by providing an uninterrupted supply of electric power so that even when the electric vehicle is not moving, electric power may be continuously supplied to the air conditioning compressor via an independent battery unit instead of via the alternator to ensure that power supply to the air conditioning system is not interrupted. Furthermore, the charging electricity may be fed back to the battery jar unit 1 and the independent battery jar unit 5 to constitute a cyclical supply of electricity to ensure the electric power accumulating capacity of the battery jars and prolong the service life of batteries.

Through the present invention, an automatic cyclical recharging and air conditioner operation power supply system for electric vehicles so that the electric vehicle has a long and stable supply of electricity and its air conditioning system can function normally when the electric vehicle is not moving. Hence, electric vehicles can be commercialized and become popular so as to better protect the environment. At the same time, the service life of battery jars may be prolonged considerably. Decreased use of battery jars also helps solve the pollution problem caused by disposal of battery jars to a certain extent.

Although the present invention has been illustrated and described with reference to the preferred embodiment thereof, it should be understood that it is in no way limited to the details of such embodiment but is capable of numerous modifications within the scope of the appended claims.

What is claimed is:

1. An electrical system for electric vehicles comprising:

a) a battery jar unit with a direct current output;

b) a direct current conversion alternator connected to the output of the battery jar unit to convert the direct current into an alternating current output having a first voltage;

c) a transformer stabilizer connected to the output of the conversion alternator to transform the alternating current at a first voltage into alternating current having a second voltage, wherein said second voltage is different from the first voltage; and, d) a charger unit receiving the alternating current at the second voltage from the transformer stabilizer and having an output of direct current connected to the battery jar unit for cyclical charging of the battery jar unit.

2. The electrical system of claim 1 wherein the battery jar unit comprises two battery jars connected in series and wherein the charger unit is connected to a positive terminal of one of the two battery jars and to a negative terminal of the other of the two battery jars.

3. The electrical system of claim 1 wherein the battery jar unit comprises a single battery jar.

4. An electrical system for an electric vehicle having an air conditioning system requiring alternating current comprising:

a) a battery jar unit with a direct current output;

b) a direct current conversion alternator connected to the output of the battery jar unit to convert the direct current into an alternating current output having a first voltage; and, c) a transformer stabilizer connected to the output of the conversion alternator to transform the alternating current at a first voltage into alternating current having a second voltage, wherein said second voltage is different from the first voltage, and an alternating current output at the second voltage connected to the air conditioning system.

5. The electrical system of claim 4 wherein the battery jar unit comprises two battery jars connected in series and wherein the charger unit is connected to a positive terminal of one of the two battery jars and to a negative terminal of the other of the two battery jars.

\* \* \* \* \*